United States Patent Office.

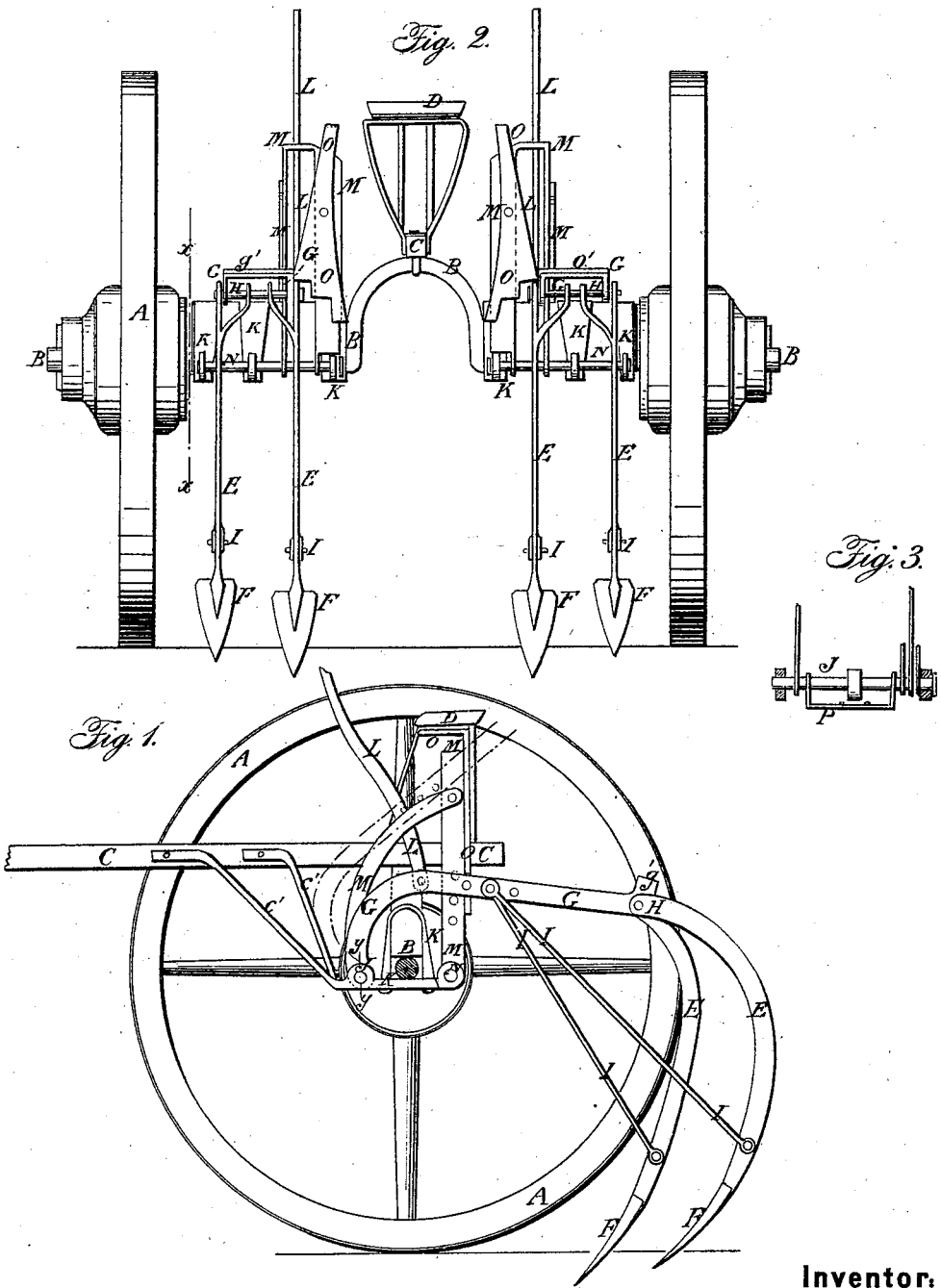

MORGAN BARNETT AND ELI WOOD, OF HARDINSBURG, INDIANA.

Letters Patent No. 70,779, dated November 12, 1867.

IMPROVEMENT IN CULTIVATORS.

The Schedule referred to in these Letters Patent and making part of the same.

TO ALL WHOM IT MAY CONCERN:

Be it known that we, MORGAN BARNETT and ELI WOOD, of Hardinsburg, in the county of Washington, and State of Indiana, have invented a new and useful Improvement in Cultivators; and we do hereby declare that the following is a full, clear, and exact description thereof, which will enable others skilled in the art to make and use the same, reference being had to the accompanying drawings, forming part of this specification.

Figure 1 is a side view of our improved cultivator, partly in section, through the line $x\ x$, fig. 2.

Figure 2 is a rear view of the same.

Figure 3 is a detail sectional view of the same taken through the line $y\ y$, fig. 1.

Similar letters of reference indicate corresponding parts.

Our invention has for its object to furnish an improved cultivator, so constructed and arranged as to run lighter, be more durable, and less liable to get out of order than the cultivators now in common use; and it consists in the construction and arrangement of the various parts, as hereinafter more fully described.

A are the wheels, and B is the axle of the cultivator. The middle part of the axle B is bent or curved upward, as shown in fig. 2, to enable the cultivator to pass over tall corn or cotton without danger of breaking or knocking down the plants. C is the tongue, which is secured to the middle or bent part of the axle B, and which is strengthened by the braces $c'$. D is the driver's seat, which is attached to the rear part of the tongue C, as shown in figs. 1 and 2. E are the uprights or plough-standards, to the lower ends of which are attached the ploughs F, which are secured in place by bolts passing through the said ploughs and through the standards E. In the upper edge of the ploughs F are formed notches, which fit upon shoulders formed upon the standards E, to prevent the said ploughs from being moved out of place sidewise. The upper ends of the standards E are branched, and are pivoted to the rear ends of the beams G by pins or bolts H, as shown in figs. 1 and 2. The standards E and beams G are held in their proper relative positions by the brace-rods I, the upper ends of which are adjustably attached to the beams G, so that by changing their position the pitch of the ploughs, and consequently the depth at which they run in the ground, may be adjusted at pleasure. The lower ends of the brace-rods I are secured to the standards E by wooden pins, so that, should the ploughs F strike an obstruction, the said pins may give way, allowing the ploughs and standards to swing back without breaking the cultivator any further. The forward ends of the beams G pass over the axle B, are bent downward, and are pivoted to rods J passing through the eyes of the clips K, three of which are attached to each horizontal part of the axle B, as shown in fig. 2. The rear ends of each pair of beams G are connected to each other by bars or straps $g'$, attached to or formed solid with the said beams, so that they may always be held in the same relative positions. L are levers rigidly attached to the beams G, and extending into such a position that they may be easily reached and operated by the driver from his seat, to raise the ploughs in passing over obstructions. The plough-beams G and levers L are guided, while moving up and down, by the guide-frames M, the lower ends of which rest upon and are secured in place by the rods or bolts J and N, passing through the eyes of the clips K in front and rear of the axle B, as shown in fig. 1. The beams G and frames M have each several holes formed through them for the reception of a pin, so that the beams and ploughs may be supported so that the ploughs may run at any desired depth in the ground, or held at any desired distance above the ground. O are graduated lever-stops pivoted to the frames M, and having several shoulders formed upon them, so as to hold the plough-beams G firmly, and cause the ploughs to run steadily at whatever depth they may be adjusted to run. The upper ends of the lever-stops O extend up, so that they may be easily reached and operated by the driver from his seat. The two sets of ploughs may be made to run closer together or wider apart by moving the forward ends of the beams G upon the rods J to which they are pivoted. P are keys pivoted to the rods J by their slotted end arms, through which the said rod passes, so that, as they are turned down, as shown in fig. 3, they may drop, so that the ends of the beams may be moved as desired. But when the said keys are turned up so that the body of the said key may pass in between the eye of the central clip and the axle B, the said key will be forced downward, so that the projections or lugs formed upon its lower side may hold the forward ends of the beams securely in place.

We claim as new, and desire to secure by Letters Patent—

1. The plough-frames formed by the combination of the beams G, standards E, and adjustable brace-bars I, with each other, substantially in the manner herein shown and described and for the purpose set forth.

2. Pivoting the beams G upon the forward side of the axle B by means of the rods or bolts J and clips K, substantially as herein shown and described and for the purpose set forth.

3. The combination of the locking-keys P with the forward ends of the beams G and with the rods or bolts J, substantially as herein shown and described and for the purpose set forth.

4. The combination of the guide-frames M with the beams G and rods or bolts J and N, substantially as herein shown and described and for the purpose set forth.

5. The combination of the levers L with the beams G and guide-frames M, substantially as herein shown and described and for the purpose set forth.

6. The combination of the graduated stop-levers O with the beams G and guide-frames M, substantially as herein shown and described and for the purpose set forth.

MORGAN BARNETT,
ELI WOOD.

Witnesses:
 ISOM WELMAN,
 JAMES McINTOSH.